(12) United States Patent
de Vries et al.

(10) Patent No.: US 8,196,345 B1
(45) Date of Patent: Jun. 12, 2012

(54) DELIVERY SYSTEM FOR UTILIZING CONDENSED WATER IN AIR CONDITIONING SYSTEMS

(76) Inventors: S. Scott de Vries, Ingersoll (CA); Doris Dilella de Vries, Ingersoll, CA (US)

( * ) Notice: Subject to any disclaimer, the term of this patent is extended or adjusted under 35 U.S.C. 154(b) by 110 days.

(21) Appl. No.: 12/703,600

(22) Filed: Feb. 10, 2010

(51) Int. Cl.
*A01G 25/16* (2006.01)

(52) U.S. Cl. .......................................................... 47/48.5

(58) Field of Classification Search ............... 47/48.5, 47/58.1 R, 59 R, 62 C; 239/276
See application file for complete search history.

(56) References Cited

U.S. PATENT DOCUMENTS

| | | | |
|---|---|---|---|
| 5,310,281 A * | 5/1994 | Elena | 405/39 |
| 6,243,986 B1 * | 6/2001 | Crowley | 47/48.5 |
| 6,343,480 B1 | 2/2002 | Correa et al. | |
| D466,972 S | 12/2002 | Clivio | |
| 6,584,795 B1 | 7/2003 | Bruss | |
| 6,592,049 B1 * | 7/2003 | Wolput | 239/70 |
| 7,047,998 B2 | 5/2006 | McKee | |
| 7,303,148 B2 | 12/2007 | Campbell et al. | |
| 2005/0092009 A1 | 5/2005 | Thurman | |
| 2007/0158458 A1 * | 7/2007 | Wheeler | 239/69 |
| 2009/0175683 A1 * | 7/2009 | Jin Hyun et al. | 405/44 |

* cited by examiner

*Primary Examiner* — Rob Swiatek
*Assistant Examiner* — Lisa Tsang

(57) ABSTRACT

A delivery system for delivering condensed water obtained from a condensate disposal tube of an air conditioning system to a garden or lawn, the system features a main tube for fluidly connecting to the condensate disposal tube of the air conditioning system, the second end of the main tube is closed; a plurality of secondary tubes fluidly branching from the main tube; and a spike component fluidly attached on the second end of each secondary tube, the spike component has a pointed end for allowing a user to easily drive the spike component into the garden or lawn, the spike component comprises a valve system that can move between an open position and a closed, position to respectively allow and prevent the condensed water from exiting the spike component and flowing into the garden or lawn.

18 Claims, 3 Drawing Sheets

DELIVERY SYSTEM FOR UTILIZING CONDENSED WATER IN AIR CONDITIONING SYSTEMS

FIELD OF THE INVENTION

The present invention is directed to irrigation systems, more particularly to a system comprising a collection of tubes for delivering condensed water of an air conditioning system to plants in a garden or lawn.

BACKGROUND OF THE INVENTION

In many places, water is scarce and otherwise costly. The present invention features a system for delivering the condensed water from an air conditioning system to a garden or lawn. The delivery system of the present invention can help conserve water and eliminate waste. In addition, the system of the present invention may help save a user money by reducing his/her water bill.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a system for delivering condensed water obtained from a condensate disposal tube of an air conditioning system to a garden or lawn. The delivery system comprises a main tube having a first end and a second end, the first end is for fluidly connecting to the condensate disposal tube of the air conditioning system, the second end of the main tube is closed; a plurality of secondary tubes fluidly branching from the main tube, each secondary tube has a first end and a second end, the first end of each secondary tube is removably connected to the main tube via a first connecting means; and a spike component fluidly attached on the second end of each secondary tube, the spike component has a pointed end for allowing a user to easily drive the spike component into the garden or lawn, the spike component comprises a valve system that can move between an open position and a closed position to respectively allow and prevent the condensed water from exiting the spike component and flowing into the garden or lawn.

In some embodiments, the second end of the main tube is closed via a plug. In some embodiments, the main tube is constructed from a material comprising plastic. In some embodiments, the main tube is between about 18 to 22 feet in length as measured from the first end to the second end. In some embodiments, the main tube is between about ¼ to 1 inch in diameter.

In some embodiments, the first connecting means extends from the main tube and a first end of the secondary tube can snap or slide onto the first connecting means. In some embodiments, a second connecting means is disposed on the spike component, the spike component attaches to the second end of the secondary tube via the second connecting means. In some embodiments, the second end of the secondary tube can snap or slide onto the second connecting means. In some embodiments, the valve system can be turned in a first direction to move the valve system to the open position and the valve system can be turned in a second direction to move the valve system to the closed position.

The present invention also features a method of watering a garden or lawn. The method comprises obtaining the aforementioned delivery system; attaching the first end of the main tube to the condensate disposal tube of the air conditioning system; attaching one or more secondary tubes to the main tube via the respective first connecting means; inserting the spikes into the garden or lawn as desired; and moving the valve system to the on position.

DESCRIPTION OF PREFERRED EMBODIMENTS

Figure 1:
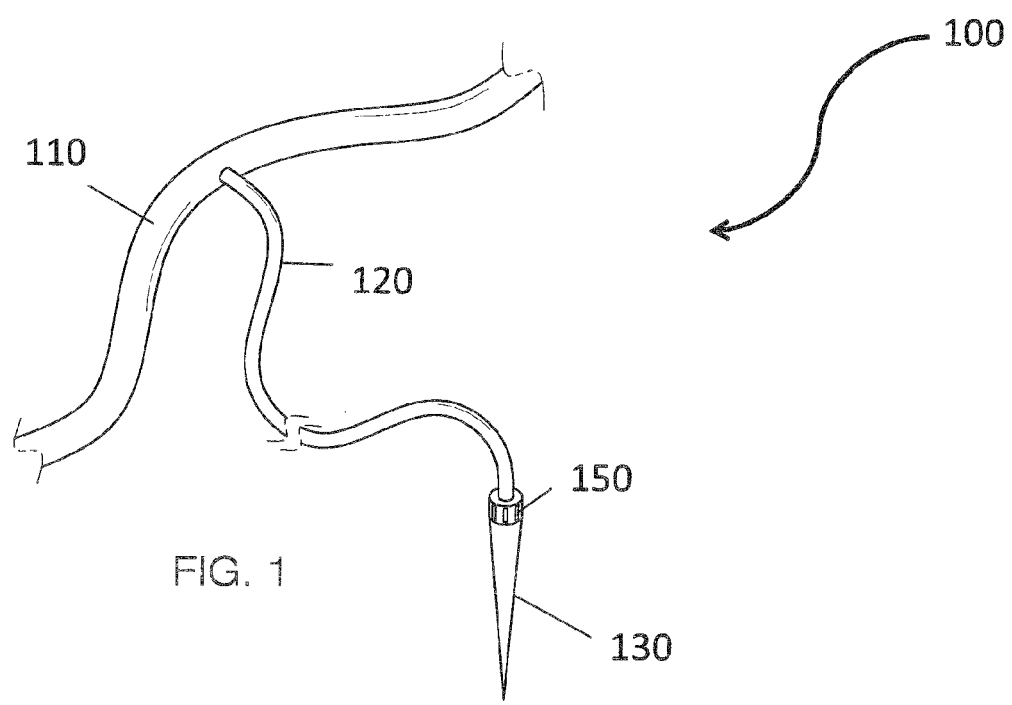
FIG. 1 is a perspective view of the delivery system of the present invention.
Figure 2:
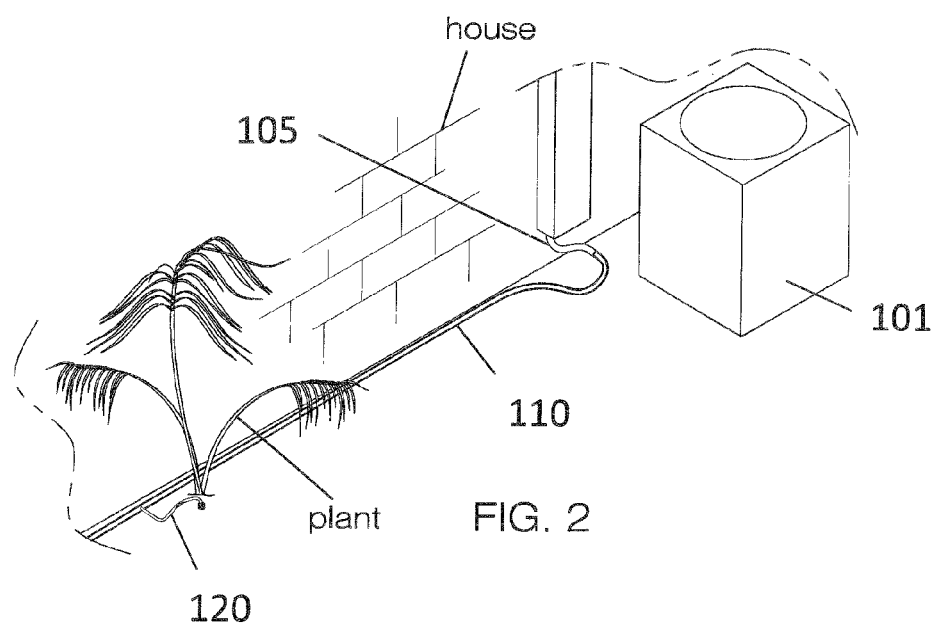
FIG. 2 is a second perspective view of the delivery system of FIG. 1.
Figure 3:
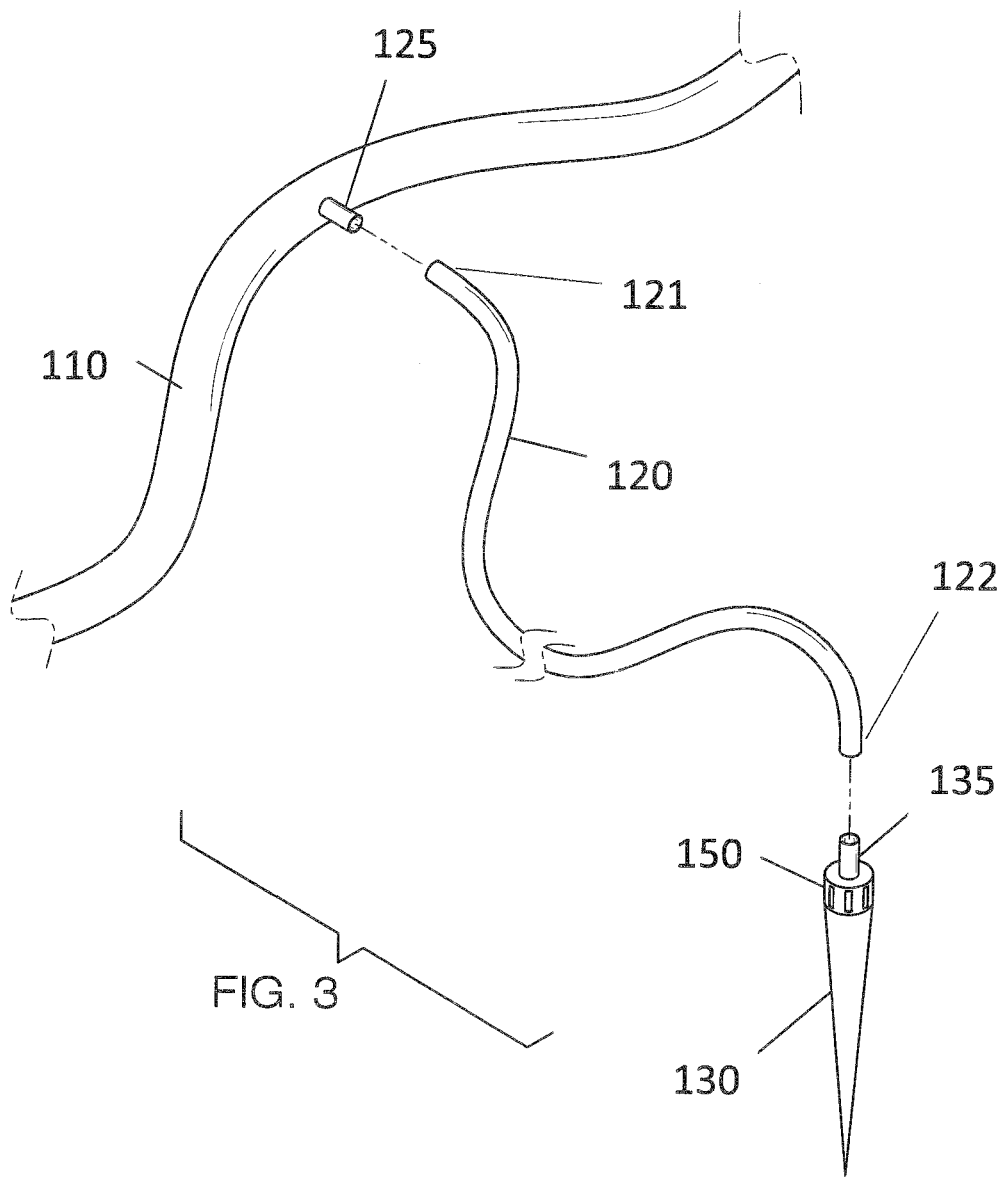
FIG. 3 is an exploded view of the delivery system of FIG. 1.
Figure 4:
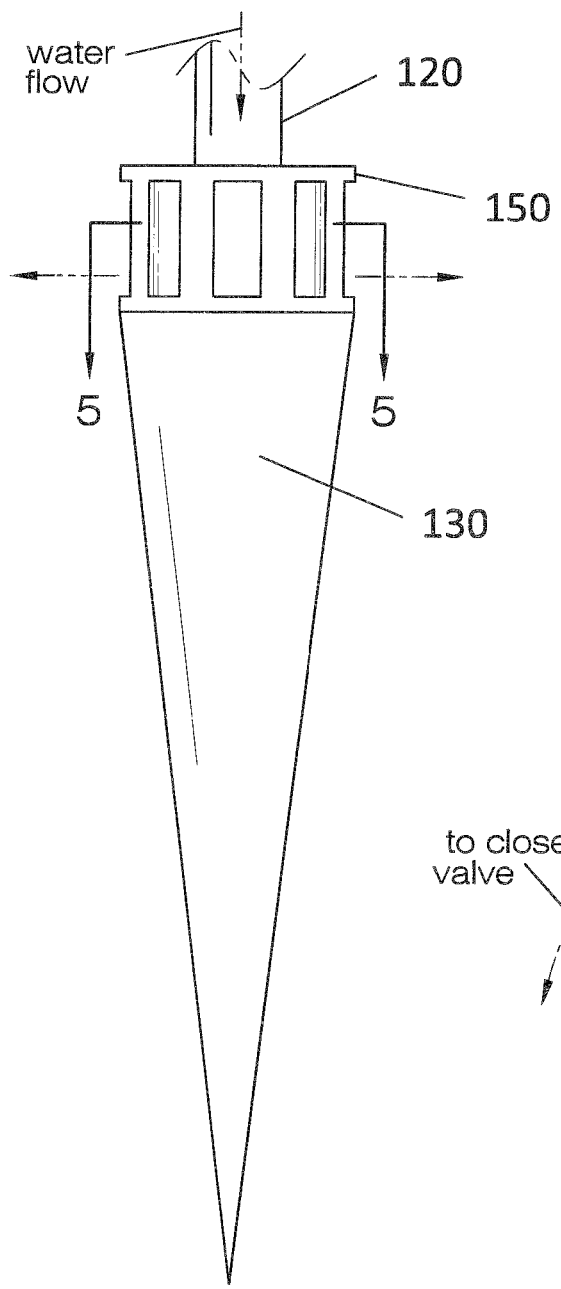
FIG. 4 is a side view of the spike component of the system of the present invention.
Figure 5:
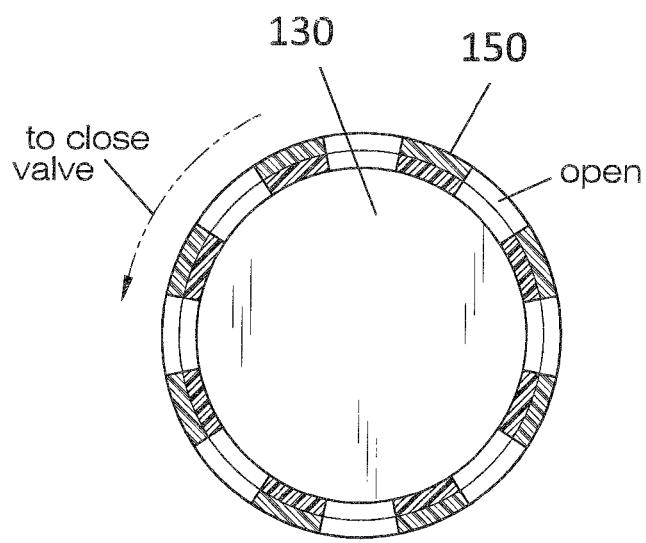
FIG. 5 is a top cross sectional view of the spike component of FIG. 4.

Referring now to FIG. 1-5, the present invention features a delivery system 100 for delivering water obtained from an air conditioning system 101 (e.g., the condensate) to a garden or lawn. The condensate is collected from the evaporative portion of the air conditioning system 101, for example from the condensate disposal tube 105.

The system 100 comprises a main tube 110 having a first end and a second end. The first end of the main tube 110 can be connected (e.g., fluidly) to the condensate disposal tube 105 of the air conditioning system 101. The second end of the main tube 110 may be closed (e.g., via a plug).

The main tube 110 may be constructed in a variety of sizes and from a variety of materials. For example, in some embodiments, the main tube 110 is constructed from a material comprising plastic. In some embodiments, the main tube 110 is between about 18 to 22 feet in length (e.g., 20 feet) as measured from the first end to the second end. In some embodiments, the main tube 110 is between about ¼ to 1 inch in diameter (e.g., ½ inch).

Disposed along the main tube 110 (e.g., branching from the main tube 110) is a plurality of secondary tubes 120. The secondary tubes 120 are each fluidly connected to the main tube 110. The secondary tubes 120 allow the condensate that enters the main tube 110 to be directed to specific locations in the lawn or garden.

The secondary tubes 120 may be removably connected to the main tube 110 via a first connecting means 125. For example, a first connecting means 125 may extend from the main tube 110 and the first end 121 of the secondary tube 120 can snap or slide onto the first connecting means 125. Such connecting means are well known to one or ordinary skill in the art.

Disposed on the second end 122 of each secondary tube 120 is a spike component 130. In some embodiments, a second connecting means 135 is disposed on the spike component 130. The second end 122 of the secondary tube 120 can snap or slide onto the second connecting means 135.

The spike component has a pointed end for allowing a user to easily drive the spike component into the ground surface. The spike component 130 comprises a valve system 150 that can move between an open position and a closed position to respectively allow and prevent the condensate in the secondary tube 120 from exiting the spike component 130 and/or secondary tube 120. In some embodiments, the valve system 150 can be turned in a first direction to open the valve system 150 and a second direction to close the valve system 150.

The present invention also features a method of watering a lawn. The method comprises obtaining the delivery system 100 of the present invention and attaching the first end of the main tube 110 to the condensate disposal tube 105 of the air conditioning system 101. The method further comprises attaching one or more secondary tubes 120 to the main tube 110 and inserting the respective spikes into the lawn as desired. The valve system 150 can be moved to the on position.

As used herein, the term "about" refers to plus or minus 10% of the referenced number. For example, an embodiment wherein the main tube 110 is about 20 feet in length includes a main tube 110 that is between 18 and 22 feet in length.

The following the disclosures of the following U.S. patents are incorporated in their entirety by reference herein: U.S. Pat. No. 7,047,998; U.S. Pat. Application No. 2005/0092009; U.S. Pat. No. 6,584,795; U.S. Pat. No. 6,343,480; U.S. Pat. No. 7,303,148.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A delivery system for delivering condensed water obtained from a condensate disposal tube of an air conditioning system to a garden or lawn, the delivery system comprising:
   (a) a main tube having a first end and a second end, the first end is for fluidly connecting to the condensate disposal tube of the air conditioning system, the second end of the main tube is closed;
   (b) a plurality of secondary tubes fluidly branching from the main tube, each secondary tube has a first end and a second end, the first end of each secondary tube is removably connected to the main tube via a first connecting means;
   (c) a spike component fluidly attached on the second end of each secondary tube, each spike component has a pointed end for allowing a user to easily drive each spike component into the garden or lawn, the spike component comprising a valve system incorporated therein that can move between an open position and a closed position to respectively allow and prevent the condensed water from exiting the spike component and flowing into the garden or lawn; and
   (d) a condensate disposal tube of an air conditioning system fluidly connected to the main tube;
   wherein each valve system is positioned at a proximal end of each spike component and immediately adjacent to a distal end of each secondary tube.

2. The delivery system of claim 1, wherein the second end of the main tube is closed via a plug.

3. The delivery system of claim 1, wherein the main tube is constructed from a material comprising plastic.

4. The delivery system of claim 1, wherein the main tube is between about 18 to 22 feet in length as measured from the first end to the second end.

5. The delivery system of claim 1, wherein the main tube is between about ¼ to 1 inch in diameter.

6. The delivery system of claim 1, wherein the first connecting means extends from the main tube, and a first end of the secondary tube can snap or slide onto the first connecting means.

7. The delivery system of claim 1, wherein a second connecting means is disposed on the spike component, the spike component attaches to the second end of the secondary tube via the second connecting means.

8. The delivery system of claim 7, wherein the second end of the secondary tube can snap or slide onto the second connecting means.

9. The delivery system of claim 1, wherein the valve system can be turned in a first direction to move the valve system to the open position and the valve system can be turned in a second direction to move the valve system to the closed position.

10. A method of watering a garden or lawn, the method comprises:
   (a) obtaining a delivery system obtaining condensed water from a condensate disposal tube of an air conditioning system, the delivery system comprising:
      (i) a main tube having a first end and a second end, the first end is for fluidly connecting to the condensate disposal tube of the air conditioning system, the second end of the main tube is closed;
      (ii) a plurality of secondary tubes fluidly branching from the main tube, each secondary tube has a first end and a second end, the first end of each secondary tube is removably connected to the main tube via a first connecting means; and
      (iii) a spike component fluidly attached on the second end of each secondary tube, each spike component has a pointed end for allowing a user to easily drive the spike component into the garden or lawn, each spike component comprising a valve system incorporated therein that can move between an open position and a closed position to respectively allow and prevent the condensed water from exiting the spike component and flowing into the garden or lawn, wherein each valve system is positioned at a proximal end of each spike component and immediately adjacent to a distal end of each secondary tube;
   (b) attaching the first end of the main tube to the condensate disposal tube of the air conditioning system;
   (c) attaching one or more secondary tubes to the main tube via the respective first connecting means;
   (d) inserting the spikes into the garden or lawn as desired; and
   (e) moving the valve system to the on position.

11. The delivery system of claim 10, wherein the second end of the main tube is closed via a plug.

12. The delivery system of claim 10, wherein the main tube is constructed from a material comprising plastic.

13. The delivery system of claim 10, wherein the main tube is between about 18 to 22 feet in length as measured from the first end to the second end.

14. The delivery system of claim 10, wherein the main tube is between about ¼ to 1 inch in diameter.

15. The delivery system of claim 10, wherein the first connecting means extends from the main tube, and a first end of the secondary tube can snap or slide onto the first connecting means.

16. The delivery system of claim 10, wherein a second connecting means is disposed on the spike component, the spike component attaches to the second end of the secondary tube via the second connecting means.

17. The delivery system of claim 16, wherein the second end of the secondary tube can snap or slide onto the second connecting means.

18. The delivery system of claim 10, wherein the valve system can be turned in a first direction to move the valve system to the open position and the valve system can be turned in a second direction to move the valve system to the closed position.

* * * * *